US009255809B2

(12) United States Patent
Marks

(10) Patent No.: US 9,255,809 B2
(45) Date of Patent: Feb. 9, 2016

(54) SYSTEM AND METHOD FOR INTEGRATED TRIP PLANNING BASED ON FIXED AND FLEXIBLE ITINERARY COMPONENTS

(75) Inventor: Joshua Benegal Marks, McClean, VA (US)

(73) Assignee: Global Eagle Entertainment Inc., Marina Del Ray, CA (US)

( * ) Notice: Subject to any disclaimer, the term of this patent is extended or adjusted under 35 U.S.C. 154(b) by 32 days.

(21) Appl. No.: 13/436,734

(22) Filed: Mar. 30, 2012

(65) Prior Publication Data

US 2013/0261956 A1    Oct. 3, 2013

(51) Int. Cl.
  *G01C 21/34*    (2006.01)
  *G06Q 10/02*    (2012.01)
(52) U.S. Cl.
  CPC ........ *G01C 21/3423* (2013.01); *G01C 21/3484* (2013.01); *G06Q 10/025* (2013.01)
(58) Field of Classification Search
  CPC ........................... G08G 1/096883; G08G 1/20
  USPC ........................... 701/425, 532, 533; 340/990
  See application file for complete search history.

(56) References Cited

U.S. PATENT DOCUMENTS

| 2003/0182052 A1* | 9/2003 | DeLorme et al. ............. 701/201 |
| 2005/0058155 A1* | 3/2005 | Mikuriya et al. ............. 370/474 |
| 2007/0016363 A1* | 1/2007 | Huang et al. .................. 701/201 |
| 2011/0307280 A1 | 12/2011 | Mandelbaum |

* cited by examiner

*Primary Examiner* — John Q Nguyen
*Assistant Examiner* — Rodney P King
(74) *Attorney, Agent, or Firm* — Perkins Coie LLP

(57) ABSTRACT

The techniques introduced here include a method for estimating a travel time between an origin and a destination. The method comprises determining a plurality of travel options from the origin to the destination. Further, each travel option is divided into a plurality of serial travel segments such that the travel segments serially connect the origin to the destination. For each of the travel options, the method further comprises estimating a time of travel in each of the travel segments. The estimated time of travel in a given travel segment is a function of both the nature of travel service associated with the segment and the one or more second user preferences associated with a travel service used in the segment. The method further comprises calculating, for each of the travel options, the total estimated travel time as a function of estimated travel times associated with each of the travel segments.

25 Claims, 10 Drawing Sheets

Travel Schedule Permutation

Itinerary of a Travel Plan (400)

Process for Estimation of Departure Time and Possible Arrival Time

Figure 6

PORTRIP

SHOWING RESULTS
FROM: 1468 WAGGAMAN CIRCLE, MCLEAN VA 22101
TO: 11830 MAYFIELD AVE, LOS ANGELES, CA 90049

LEAVE: FEBRUARY 20, 2012 12:00PM (FLEXIBLE)
ARRIVE: FEBRUARY 20, 2012 3:00PM (NO LATER THAN)

JOSH MARKS

| MORE INFO | DEPARTURE DATE & TIME | DRIVE TO AIRPORT | ORIGIN AIRPORT | YOUR FLIGHTS | ARRIVAL AIRPORT | DRIVE TO DEST | ARRIVAL DATE & TIME |
|---|---|---|---|---|---|---|---|
| ▶ | 2/20/2012 6:57AM | 23 MINUTES 17.6 MILES MAP LINK | IAD In 7:20AM Out 8:20AM | UA 319 IAD-LAX 8:20AM-11:11AM NONSTOP, A319 9F/128Y ON-TIME (13 MIN AVG DELAY) | LAX In 11:11AM Out 11:31AM | 21 MINUTES 13.4 MILES MAP LINK | 2/20/2012 11:52AM |
| ▶ | 2/20/2012 4:38AM | 22 MINUTES 12.1 MILES MAP LINK | DCA In 5:00AM Out 6:00AM | UA 1625 DCA-IAH 6:00-8:30AM NONSTOP, B737-800 16F/126Y ON-TIME 82% (12 MIN AVG DELAY) CONNECT AT IAH (45 MIN) CONNECTION RATE: 95% (38 OF 40) UA 1495 IAH-LAX 9:15-11:06AM NONSTOP, B757-300 24F/189Y ON-TIME 86% (15 MIN AVERAGE DELAY) | LAX In 11:06AM Out 11:26AM | 21 MINUTES 13.4 MILES MAP LINK | 2/20/2012 11:47AM |
| ▶ | 2/20/2012 4:18AM | 44.9 MINUTES 57 MINUTES MAP LINK | BWI In 5:15AM Out 6:15AM | WN 1515 BWI-MDW (75 MIN) NONSTOP, B737-700 137Y ON-TIME 82% (12 MIN AVG DELAY) CONNECT AT MDW (75 MIN) CONNECTION RAGE: 97% (29 OF 30) WN 1847 MDW-LAX 8:35-11:10AM NONSTOP, B737-700 137Y ON-TIME 82% (12 MIN AVERAGE DELAY) | LAX In 11:10AM Out 11:30AM | 21 MINUTES 13.4 MILES MAP LINK | 2/20/2012 11:51AM | powered by
masFlight

*Figure 7*

PORTRIP

YOUR SELECTED ITINERARY
LEAVE AT 6:00AM, ARRIVE AT 11:47AM

STARTING POINT     Get Directions
1468 Waggaman Circle     View Map
McLean, VA 22101

Departure time:    4:38am Eastern
Travel to airport:    22 minutes (12.1 mi)
Arrive at:    IAD Washington Dulles
Time at airport:    5:00am arrive at airport
   6:00am departure time

☐ ARRANGE LIMO PICKUP

FLIGHT INFORMATION
UNITED 1625 DCA-IAH

Departs Washington Reagan (DCA) at 6:00am
Flight time 3 hours 30 minutes
Arrives Houston Intercontinental (IAH) at 8:30am
On-time departures last 90 days:    75.0%
On-time arrivals last 90 days:    90.0%
Completion rate last 90 days:    99.1%

Connection time at Houston: 45 minutes (85% success last 90 days)

FLIGHT INFORMATION
UNITED 114955 IAH-LAX

Departs Houston Intercontinental (IAH) at 9:15am
Flight time 3 hours 41 minutes
Arrives Los Angeles (LAX) at 11:06am
On-time departures last 90 days:    75.0%
On-time arrivals last 90 days:    90.0%
Completion rate last 90 days:    99.1%

Next flight IAH-LAX: UA 495 IAH-LAX 11:30am-2:15pm

ENDING POINT     Get Directions
11830 Mayfield Avenue     View Map
Los Angeles, CA 90049

Departure time:    11:06am Pacific
Travel to airport:    20 minutes
Drive to dest.:    21 minutes (13.4 mi)
   Leave airport 11:26am
   Arrive 11:47am

☐ ARRANGE LIMO PICKUP powered by
masFlight

🔍 Josh Marks

*Figure 8*

Sun, Mar 18, 2012
Washington, DC (IAD) to Los Angeles, CA (LAX)

⦿ 7:00 AM IAD - 9:46 AM LAX
United 341 View seats
In-flight meal options
Flight details ○ 8:20 AM IAD - 11:11 AM LAX
United 319 View seats
In-flight meal options
Flight details

*Last day to purchase this fare*

301.80
USD per adult

Including taxes & fees
Price breakdown
Fare rules

SYSTEM AND METHOD FOR INTEGRATED TRIP PLANNING BASED ON FIXED AND FLEXIBLE ITINERARY COMPONENTS

FIELD OF THE INVENTION

At least one embodiment of the present invention generally relates to travel planning and, more specifically, to a system and method for providing a plurality of travel options using a combination of fixed and flexible travel services between an origin and a destination.

BACKGROUND

Travel planning generally involves first determining a mode of transportation, and then finding an ideal route from the origin to the destination. Travel planning, however, could be a complicated and, at times, a cumbersome process involving a lot of inefficiencies. For instance, some of the complications and issues that make travel planning cumbersome include travelers often having many alternatives for routes, which are often highly incomplete and include difficult to obtain route information. Some of the reasons for this difficulty include the multitude of travel providers, inhomogeneous data formats for schedule information, loss of time from route congestion or intermodal transfers, pricing schemes and taxation among many others. Even when information on alternatives is accessible to users, only a limited subset of alternatives are perceived and even fewer alternatives are actually considered. This often leads to choosing sub-optimal routes for the user. In addition, current travel planning does not allow taking full advantage of transport capacities, resulting in significant transportation overheads.

Today, travelers often use travel websites as their first source of information about different travel services. Travel websites also offer travelers travel planning services based on their preferences. Travel websites generally require travelers to provide two discrete criteria: (1) a pair of travel terminals, which include airports, rail stations or bus stations; and (2) a date and time preference for departure from the origin terminal. Depending on the type of travel service provided by the travel website, the travelers are then provided feasible travel options between the origin and the destination using the travel routes serviced by the travel service.

In an illustrative example, when a traveler wishes to fly from San Francisco to New York, the traveler chooses one of the number of airports available in and around San Francisco as the origin terminal and one of the number of airports available in and around New York as the destination terminal. The air travel website, depending on the date and time of travel, provides all the possible flight combinations between the origin terminal and the destination terminal that meets the travelers' criteria, allowing the travelers to pick the flight combination that best suits their needs. Such travel planning, however, involves only one type of travel service. Further, any additional service provided by the travel websites pertaining to other modes of travel, such as by cars, are limited to cross-selling of car rentals for travel after arriving at the destination terminal. Additionally, the travel by car is not integrated into the travel planning as part of the complete origin to destination travel.

However, few travelers actually start or end their journeys at travel terminals. Most travel by private car, taxi, public transportation or foot from a starting address (a home, office, hotel, or other landmark) to the origin terminal (defined as a rail, bus or airport terminal) where they transfer onto pre-scheduled services, such as air travel. When the travelers finally arrive at the destination terminal, they transfer back to on-demand travel services, such as private car, taxi, public transportation, or foot to continue traveling to their final destination address.

Additionally, the travel planning provided by travel websites lack basic information components travelers may need to plan their trip. First, a traveler needs to know by what time she needs to leave from her starting address, and whether that starting time is compatible with the rest of her travel schedule. For example, a business traveler may only be able to leave her office after her meeting ends at 4 pm. So, any travel option that requires a 3 pm departure will not be viable. Further, a traveler needs to know whether the itinerary leaves sufficient time (as defined by the traveler) for baggage check, security, and for connections between transport modes (connecting flights, etc.). Additionally, a traveler needs to know by what time she will arrive at her final address, and whether that time is compatible with the rest of her schedule. For example, travelers may seek travel options that arrive after hotel check-in times begin. The current travel planning provided by travel websites do not provide any of this information.

For example, consider a traveler planning a journey from the Westin Hotel in Tysons Corner, Va. to the Bonaventure Hotel in downtown Los Angeles, Calif. The length of the journey requires travel by air. Also, the traveler cannot leave before a breakfast meeting that terminates at 10 am, but must arrive at the Bonaventure Hotel in time for a 5 pm meeting. The traveler is not familiar with the possible departure or arrival airports.

In order to determine the possible airports, the traveler looks up the addresses for each point. Based on a maximum driving distance of 50 miles, the traveler determines that the airports IAD, DCA and BWI are viable origin terminals, and that the airports LAX, BUR and SNA are viable destination terminals. The traveler will then visit airline or travel agency websites to assess the possible flight combinations between the origin terminals (IAD, DCA and BWI) and the destination terminals (LAX, BUR and SNA).

An illustrative sample schedule display, as shown in FIG. 10, could appear in one of the travel websites, say for example united.com. It provides a given date, origin terminal (IAD), destination terminal (LAX), airline and flight number, and fare quote. However, it does not provide any information about what time the user must leave his starting address, or can expect to arrive at the final address.

The schedule display, as shown in FIG. 10, has not provided the user with guidance about travel time from the Westin to IAD and what time he should leave, or what time he should expect to arrive at the Bonaventure Hotel. It has not disclosed that an efficient one-stop itinerary from close by Washington Reagan (DCA) to Burbank (BUR) involves a faster overall travel time from starting to final address than the nonstop IAD-LAX trip shown above. The traveler would have to aggregate the travel time for each travel option along different travel segments to determine the travel option that best meets her needs.

Among teaching a variety of other things, certain aspects of the inventions herein have embodiments which may satisfy one or more of the above described issues.

SUMMARY OF THE DESCRIPTION

Today, a primary obstacle to calculating integrated travel times and efficient departure/arrival times between an origin and destination address is the combination of fixed and flexible travel components involved in the travel itineraries.

A fixed travel component can be, e.g., a bus, train, sea or airline flight where the departure and arrival times between predetermined origin and destination terminals are published and inflexible. The travelers must confirm their schedule to meet the fixed arrival/departure times to travel between these predetermined terminals.

A flexible travel component can be, e.g., travel by traveler-arranged car (private or taxi/limo) or other means where the traveler has reasonable control over departure time. The arrival time can be determined by both aggregate distance between the origin and distance and by delay factors such as traffic congestion, weather and competition for resources (i.e. taxi demand).

Travel websites and distribution systems are geared to display fixed travel components and leave the selection and calculation of flexible travel components to the traveler. Doing so leads to sub-optimal decisions as shown above, where a one-stop flight (with a longer en-route time) from Washington Reagan to Burbank having shorter driving segments has an overall shorter total travel time from starting to ending address than a faster nonstop flight from Washington Dulles to Los Angeles LAX to travel between the same starting to ending address. This invention incorporates both fixed and flexible travel service components into the final travel plan between a given origin and destination.

By incorporating at least some of the below iterated factors into travel time planning, the present invention fundamentally simplifies travel choice for passengers. In addition to incorporating the basic flight/rail/bus schedules and terminal times available on existing travel sites, the present invention also incorporates at least one of:

(1) Time ranges during which the user will be available to begin his journey from the starting address, or arrive at the final address.

(2) Closest terminal points to the traveler's starting address (home, hotel, office, or point of interest) and destination address.

(3) Travel time estimates from the starting address to the origin terminal, incorporating contingencies such as traffic congestion, road construction or weather conditions from both historical databases and user feedback.

(4) Possible means of travel between the starting address and the origin terminal, including private car, taxi or limo service, or mass transit schedules.

(5) Transfer time at the origin terminal onto intercity rail, bus, or air service, including time to obtain boarding passes, check baggage, clear airport security, and meet minimum (or user-defined) minimum times before departure, based on published guidelines, historical data and user feedback.

(6) Time spent at destination terminal for disembarkation and baggage claim.

(7) Transfer time at the destination terminal onto modes for travel to the destination address, including shuttles to car rental facilities, taxi queues and waiting time for mass transit options.

(8) Possible means of travel between the destination terminal and final address, including private car, rental car, taxi or limo, mass transit, shuttle or other means. and (9) Travel time estimates and contingencies from the destination terminal to the final address.

With travel options incorporating some of the travel-related information iterated above, travelers can select the most efficient itinerary based on the time they can leave their starting address and the time they must finish their journeys. The present invention describes a method and system for presenting an integrated travel plan with routing options and associated transit times from an origin to a destination. Further, the travel plan incorporates both scheduled components such as travel by air, light and intercity rail, bus, or sea, and flexible components such as personal travel by car, taxi, limo, foot or other user-arranged means. Also, the present invention provides a method and system for computing optimal departure times from origin or arrival times at destination, where the computation considers at least some of the factors affecting the time estimations, such as transit times to departure terminals, time allowances for boarding or disembarkation, traffic congestion, service reliability, etc.

According to the invention, these aims are achieved by means of a method according to claim 1. Advantageous embodiments are indicated in the other claims and in the description.

The techniques introduced here include a method for determining travel options for a user between an origin and a destination, the method comprising receiving one or more first user preferences associated with a travel between the origin and the destination. The method also includes determining a plurality of travel options from the origin to the destination, the determination of the plurality of travel options influenced by the one or more first user preferences, each travel option comprising a plurality of serial travel segments, the plurality of serial travel segments serially connected in a manner such that each travel segment is a component of a user's travel from the origin to the destination, further wherein at least two travel service types are found providing travel service for the plurality of serial travel segments.

According to another aspect of the invention introduced here also includes a system and method for estimating a travel time between an origin and a destination, the method comprising determining a plurality of travel options from the origin to the destination, the determination of the plurality of travel options influenced by the one or more first user preferences, each travel option comprising a plurality of serial travel segments, the plurality of serial travel segments serially connected in a manner such that each travel segment is a component of a user's travel from the origin to the destination, further wherein at least two travel service types are found providing travel service for the plurality of serial travel segments.

For each of the travel options, the method also includes identifying a total time of estimated travel for each of the plurality of serial travel segments, the total time of estimated travel for a given travel segment being a function of both a nature of travel service associated with the given travel segment and a one or more second user preferences associated with the travel service corresponding to the given travel segment. For each of the travel options, the method further includes calculating a total estimated travel time as a function of the sum of total estimated travel and transfer times associated with each of the plurality of travel segments. For each of the travel options, the method further includes providing the total estimated travel time to the user as a predicted travel time to travel from the origin to the destination.

According to another aspect of the invention introduced here also includes a system and method for estimation of a departure time from an origin, the method comprising determining a plurality of travel options from the origin to the destination, the determination of the plurality of travel options influenced by one or more first user preferences, each travel option comprising a plurality of serial travel segments, the plurality of serial travel segments serially connected in a manner such that each travel segment is a component of a user's travel from the origin to the destination, further wherein at least two travel service types are found providing travel service for the plurality of serial travel segments.

For each of the travel options, the method also includes sorting the plurality of serial travel segments associated with a given travel option into a fixed-travel segment and a flexible-travel segment, the sorting of the plurality of serial travel segments based on the nature of the travel service associated with each of the plurality of serial travel segments, wherein the fixed-travel segment includes travel services associated with a predetermined departure schedule and the flexible-travel segment includes travel services associated with a user determined departure schedule.

For each of the travel options, the method further includes determining a subset of one or more serial travel segments from the plurality of serial travel segments associated with a given travel option, the subset including all serially connected travel segments between a starting travel segment and a ending travel segment, wherein the starting travel segment originates from the origin and the ending travel segment terminates with the travel segment serially connected to the first travel segment associated with the fixed-travel segment.

For each of the travel options, the method also includes identifying a total time of estimated travel for each of the one or more serial travel segments included in the subset, the total time of estimated travel for a given travel segment being a function of both a nature of travel service associated with the given travel segment and a one or more second user preferences related to the travel service associated with the given travel segment.

For each of the travel options, the method also includes calculating a total estimated travel time to the first fixed-travel segment as a function of the sum of total estimated travel times associated with each of the one or more serial travel segments included in the subset.

For each of the travel options, the method further includes estimating the departure time from the origin by measuring backward from the first fixed-travel segment's departure time, wherein the amount of time to be measured backward from the first fixed-travel segment's departure time is determined by the total estimated travel time from the origin to the first fixed-travel segment.

According to another aspect of the invention introduced here also includes a system and method for estimation of an arrival time at a destination, the method comprising determining a plurality of travel options from the origin to the destination, the determination of the plurality of travel options influenced by one or more first user preferences, each travel option comprising a plurality of serial travel segments, the plurality of serial travel segments serially connected in a manner such that each travel segment is a component of a user's travel from the origin to the destination, further wherein at least two travel service types are found providing travel service for the plurality of serial travel segments.

For each of the travel options, the method further includes sorting the plurality of serial travel segments associated with a given travel option into a fixed-travel segment and a flexible-travel segment, the sorting of the plurality of serial travel segments based on the nature of the travel service associated with each of the plurality of serial travel segments, wherein the fixed-travel segment includes travel services associated with a predetermined departure schedule and the flexible-travel segment includes travel services associated with a user determined departure schedule.

For each of the travel options, the method further includes determining a subset of one or more serial travel segments from the plurality of serial travel segments associated with a given travel option, the subset including all serially connected travel segments between a starting travel segment and a ending travel segment, wherein the starting travel segment originates with the last travel segment associated with the fixed-travel segment and the ending travel segment terminates at the destination.

For each of the travel options, the method further includes identifying a total time of estimated travel for each of the one or more serial travel segments included in the subset, the total time of estimated travel for a given travel segment being a function of both a nature of travel service associated with the given travel segment and a one or more second user preferences related to the travel service associated with the given travel segment.

For each of the travel options, the method further includes calculating a total estimated travel time from the last fixed-travel segment to the destination as a function of the sum of total estimated travel times associated with each of the one or more serial travel segments included in the subset. Additionally, for each of the travel options, the method further includes estimating the arrival time at the destination by summing up the total estimated travel time with the last fixed-travel segment's arrival time.

Additional advantageous embodiments for each of the system and methods disclosed above are given in the dependent claims.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 6 is an illustration of a webpage used by the travel plan server to receive details regarding the travel and other traveler preferences;

FIG. 7 is an illustration of a webpage with listings of the received travel options and other associated travel-metrics;

FIG. 8 is an illustration of a webpage with detailed travel-related information regarding a travel option chosen from the provided list of travel options displayed in FIG. 7;

FIG. 10 is an illustration of an example travel schedule display.

DETAILED DESCRIPTION

A method and system for presenting an integrated travel plan with routing options and associated transit times from an origin to a destination and more specifically the travel plan incorporates both scheduled components, such as travel by air, rail, bus, or sea, and flexible components, such as personal travel by car, taxi, limo, foot or other traveler-arranged means. Note that references in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
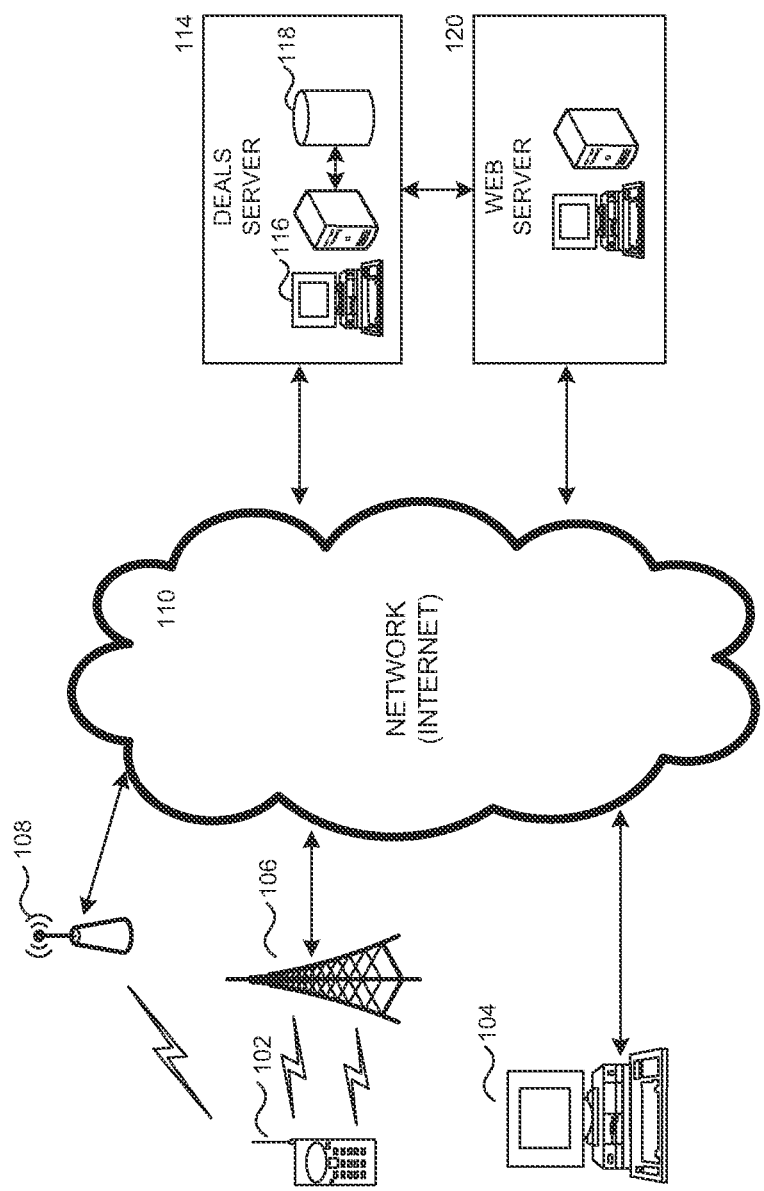
FIG. 1 and the following discussion provide a brief, general description of a representative environment in which the invention can be implemented.

FIG. 1 and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a user may use a personal computing device (e.g., a phone 102, a personal computer 104, etc.) to communicate with a network. The term "phone," as used herein, may be a cell phone, a personal digital assistant (PDA), a portable email device (e.g., a Blackberry®), a portable media player (e.g., an IPod Touch®), or any other device having communication capability to connect to the network. In one example, the phone 102 connects using one or more cellular transceivers or base station antennas 106 (in cellular implementations), access points, terminal adapters, routers or modems 108 (in IP-based telecommunications implementations), or combinations of the foregoing (in converged network embodiments).

In some instances, the network 110 is the Internet, allowing the phone 102 (with, for example, WiFi capability) or the personal computer 104 to access web content offered through various web servers. In some instances, especially where the phone 102 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In some instances, a user uses one of the personal computing devices (e.g., the phone 102, the personal computer 104, etc.) to connect to a travel plan server 114 through the network 110. In one embodiment, the travel plan server 114 comprises a server computer 116 coupled to a local database 118. The term "travel plan server" as indicated herein, refers to a server station or other computing apparatus capable of hosting a web service that is accessible by other computing systems (e.g., the personal computer 104) through, for example, the Internet.

The travel plan server 114 illustrated in FIG. 1 operates an integrated travel planning and scheduling service. The term "integrated travel planning and scheduling service" (or simply, a "travel service") as indicated herein, refers to a suite of operations that may include, for example, receiving a traveler's starting and ending address and other travel preferences, such as time of travel, converting location addresses into geographic coordinates such as GPS coordinates, querying multiple sources to identify available travel terminals for different modes of travel within a fixed radius around the starting and ending coordinates, querying travel service schedules for each available travel service from the identified terminals, determining possible routes between origin and destination based on the received travel service schedule, estimating travel time and other travel metrics for each possible travel route based to help traveler choose the best available travel option, presenting the travel routes and associated travel metrics to the traveler, etc. As will be explained in further detail herein, the travel plan server 114 incorporates one or more functional units to achieve each of the above discussed functionalities.

In some instances, the travel plan server 114 also operates as a web server to enable the travel service to be offered through a webpage. In such instances, the travel server 114 may operate additionally as a web server or may be coupled to a separate web server to provide the web functionalities.

As shown in FIG. 1, the personal computing devices and the travel plan server 114 are connected through the network 110 to one or more web servers (e.g., web server 120). Each web server corresponds to a computing station that enables a third party (e.g., a travel website through which a traveler can plan her travel, a website hosted by a travel agent through which a traveler can plan her travel, etc.) to host, for example, a travel-planning service that can be accessed through the network 110.

As will be explained in more detail below, in one embodiment, the travel plan server 114 (or specifically, the travel service running on the server computer 116) receives a traveler's starting (i.e. origin) and ending (i.e. destination) addresses (including complete or partial street addresses, buildings, intersections, neighborhoods, cities, airports, geographic coordinates or other landmarks) and other travel preferences, such as time of travel, and if not already expressed as geographic coordinates, converts the location points into geographic coordinates. The geographic coordinates can be any of the universally followed coordinate system, such as GPS coordinates. The travel plan server 114 then establishes a search radius around the addresses based on their coordinates and searches for travel terminals used by different modes of travel services. One example of a travel service could be an airline. The related travel terminal would then be any airport. The travel plan server 114 can search for travel terminals by querying a local database 118 associated with the travel plan server 114, which stores data related to travel services and their related travel terminals by geographic location.

The travel plan server 114 can again query the local database 118 associated with the travel plan server 114 for travel service schedules for each available travel service from each of the identified terminals. For example, the identified travel service could be airline service, say through United Airlines, and the airports associated with the starting address could be A, B, and C. The airports associated with the ending address could be D, E, and F. Based on the traveler's preferred date and time of travel, the travel plan server 114 could query the local database 118 for all schedule information pertaining to United Airlines flights originating from airports A, B, or C and all flights ending in airports D, E, or F.

The requested information could include flights that fly non-stop between the terminals or fly directly between the terminals with stop-overs in intermediate terminals. Further, the requested information could include flight itineraries that require a change of flight number, operating carrier (including regional and airline code-share flights) or equipment within the same airline service at an intermediate terminal between the starting and ending terminal. Also, the requested information could include flights that require a change to a different airline service, say to American Airlines, at an intermediate terminal between the starting and ending terminal. Further, the received schedule information could include information pertaining to multiple modes of travel services, such as schedule information pertaining to both flight and rail schedules between starting and ending locations.

Additionally, the received schedule information could include travel schedule information from any terminal or location at which one travel service ends and the other begins. For example, schedule information could include flight schedules from the starting address to an intermediate location from where a traveler could take the train to the ending address. The requested schedule information is merely illustrative of the kind of schedule information that the travel plan server 114 requests from local database 118, and as such, other combination of schedule information, incorporating multiple airline services through multiple intermediate terminals between starting and ending terminals, can be requested and utilized.

The travel plan server 114 utilizes the received schedule information to determine possible combinations of travel options from one or more of the travel services available between the starting and ending address. For example, as discussed above, the received schedule information could be flight schedules between starting and ending terminal, including flight schedules with stop-overs at intermediate terminals. Also, each of travel options could incorporate multiple airline services or other travel services, such as railways, either traveling non-stop between the destinations or routed through an intermediate destination on-route to the final destination. An illustrative travel plan between a starting and ending address could involve a travel segment traveling by a taxi to an airport, the next segment traveling from the airport to an intermediate location by flight, and later continuing on from the intermediate location by train to a train station close to the ending address. Finally, the travel schedule could involve another travel segment requiring taking a taxi to the final ending address.

The travel plan server 114 further provides the travelers with various travel-related timing metrics, such as total time of travel from starting to ending address, an optimal time for departure from starting address, a likely time of arrival at the ending address for each of the travel schedule, etc. that can help the traveler choose the best available travel option. The travel plan server 114 incorporates both traveler preferences, such as time allowance for baggage check-in at airport, and travel service related factors affecting travel time, and estimates the various travel-related timing metrics. In one instance, the travel plan server 114 could query the local database 118 for travel service specific factors that affect travel time, such as traffic-related delay affecting the segment of travel by car, transit times between airport terminals in the segment of travel by flights, etc. The travel plan server 114 includes the various travel service specific factors that affect travel time in the final estimation of the various travel-related timing metrics.

The travel plan server 114 presents the travel options and the associated travel metrics to the traveler, etc. In some instances, the travel plan server 114 directly provides the travel options and the associated travel metrics to the requesting personal computer 104 or phone 102. In some instances, the personal computer 104 or phone 102 could request the travel information by running a decided software application on their respective platforms. The software application could enable the personal computer 104 or phone 102 to communicate with travel plan server 114 over the network 110. In some instances, the travel plan server 114 also operates as a web server to enable the travel service to be offered through a webpage. In such instances, the travel server 114 may operate additionally as a web server or may be coupled to a separate web server to provide the web functionalities. The traveler could use a personal computer 104 or phone 102 running a web browser to access the web server 120 through a webpage and request the travel information provided by the travel plan server 114.

In some instances, the personal computer 104 or phone 102 could perform similar computing functions as the travel plan server 114 and provide the travel planning service to the traveler. The personal computer 104 or phone 102 could have a local database similar to the local database 118 associated with the travel plan server 114. The database could contain all the necessary travel-related and other information needed for the personal computer 104 or phone 102 to perform the travel planning service. In other instances, the personal computer 104 or phone 102 could communicate over the network 110 to retrieve necessary data from a database containing all the necessary travel-related and other information needed to perform the travel planning service.

For purpose of further illustration, it is useful to consider the techniques explained herein as it applies to planning in general. Of course, however, it should be noted that the techniques introduced here extend to other travel related planning.

Figure 2:
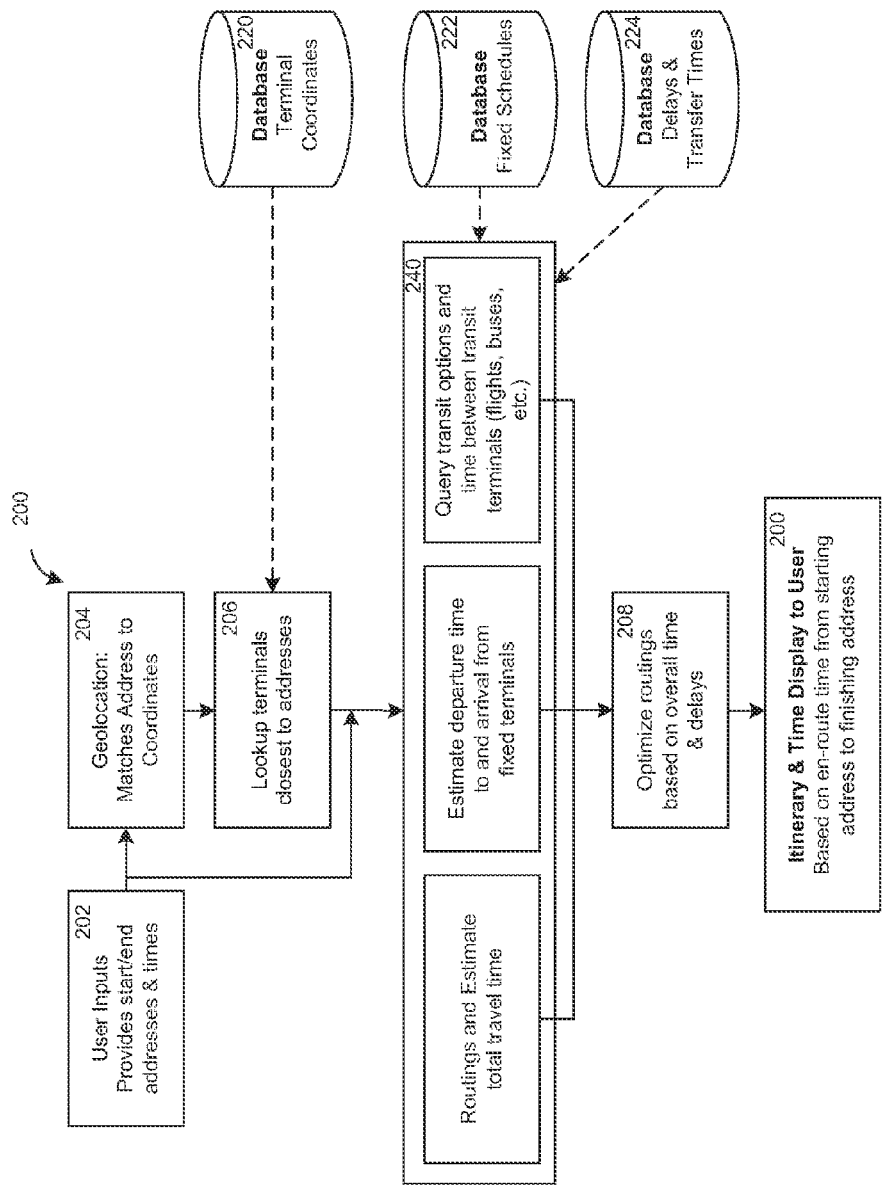
FIG. 2 is a block diagram illustrating an exemplary architecture of a travel plan server configured to perform the various functionalities of the travel planning service.

FIG. 2 is a block diagram illustrating an exemplary architecture of a computation subsystem 200 included in the travel plan server 114, which is configured to perform the various functionalities of the travel planning service. The computation subsystem 200 can be implemented by using programmable circuitry programmed by software and/or firmware, or by using special-purpose hardwired circuitry, or by using a combination of such embodiments. In some instances, the computation subsystem 200 is implemented as a unit in a processor of the travel plan server.

The computation subsystem 200 includes a receiving module 210 that, in some instances, is configured to communicate with external interfaces to receive an input from the traveler. In one example, the traveler uses a personal computing device to open a website offering the travel planning service. The web server operating the travel planning service receives any requests sent by the traveler (e.g., providing a starting and ending address, selection of a transmission mechanism to send the messages, etc.) and transmits it to the receiving module 210 of the travel plan server 114. The receiving module, in some instances, directly receives the traveler's requests and processes the requests for further processing by the travel plan server 114.

Figure 6:
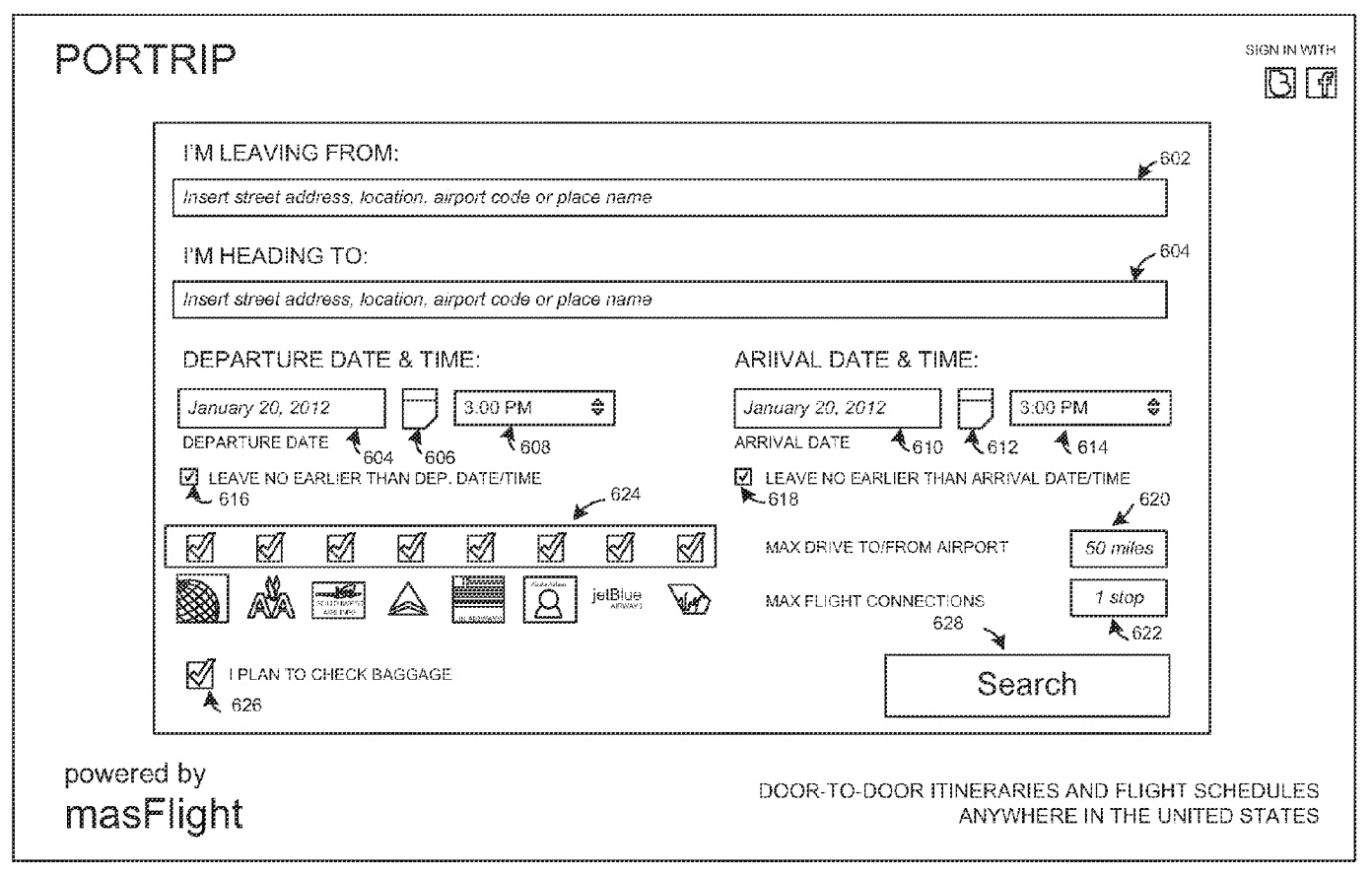

FIG. 6 is an illustration of a webpage used by the web server to receive travel requests and other travel related details, including traveler preferences, from a traveler. The webpage allows user to input the address of the origin and destination in input modules 602 and 604, which are incorporated into the webpage. The webpage further allows the traveler to specify the departure date and departure time using modules 604 and 608 respectively. Module 606 helps the traveler to input the departure date in input module 604. Module 616 captures further details regarding traveler preference with respect to departure date and time. Similarly, the traveler can specify the preferred arrival date and time into the webpage using input modules 610, 612, 614. Module 618 captures further details regarding traveler preference with respect to arrival date and time. Further, the webpage allows the traveler to specify other preferences such as maximum driving distance between airports and origin/destination addresses, maximum flight connections in a travel plan, intention to check-in baggage, preferred airline carriers, etc. in input modules 620, 622, 626, and 624 respectively. When the traveler clicks on module 628, the webpage transmits all the gathered travel-related information to the web server, which then forwards it to the receiving module 210 of the travel plan server 114.

In at least one embodiment, the request from the traveler, sent from a traveler's personal computer 104 or phone 102, could either be initiated by the traveler or be initiated automatically by software running on the traveler's personal computer 104 or phone 102. In some instance, such software could automatically provide the traveler's current location, in location coordinates, as the origin for a travel plan request and a list of addresses from the traveler's address book, in location coordinates, as the final destination as part of the travel plan request. The origin and destination information provided by the traveler, as part of the travel plan request, could be a property with an address, a name of a hotel, a name of a landmark, a transit terminal of a travel service, a location with a global positioning coordinates, etc.

In another embodiment, the request from the traveler, sent from a traveler's personal computer 104 or phone 102, includes travel preferences. The travel preferences function as a filter to shape the travel planning according to the needs of the traveler. For example, some general travel preferences used by travelers to customize their travel plan to suit their travel needs are (1) the date of travel; (2) time of travel; (3) preferred mode of transportation, where multiple modes, say air and rail, are available; (4) preferred carrier in a given mode of transportation, where for example united airlines for flying; (5) maximum radius within which to choose transit terminals associated with a travel service from; (6) earliest starting time to begin travel from origin; (7) latest terminating time to arrive at destination; (8) maximum layover time between each travel segments; (9) minimum layover time between each travel segments; (10) maximum travel time to travel from origin to destination; (11) maximum total travel cost to travel from origin to destination, etc.

The computation subsystem 200 includes an address mapping module 204 that, in some instances, is configured to communicate with the receiving module 202 to receive travelers' inputs and preferences and process elements of the received information. In some instances, the address mapping module 204 could process the traveler's origin and destination information by mapping the information into a universally understood coordinate system, such as GPS coordinates.

The computation subsystem 200 includes a terminal lookup module 206 that, in some instances, is configured to communicate with the address mapping module 204 and query local database 220 for travel related information. In some instances, the terminal lookup module 206 receives from the address mapping module 204, the origin and destination coordinates and other traveler preferences, such as preferred mode of transportation, maximum radius within which to choose transit terminals associated with a travel service from, etc. In one example, the preferred mode of transportation could be flying and the maximum radius within which to lookup airline terminals from the origin and destination could be 50 miles.

The terminal lookup module 206 queries a local database 220 for information pertaining to all modes of transportation available between the origin and destination including information pertaining to transit terminal location for each mode of transportation within a set radius. For example, one such mode of travel could be airline service, say through preferred carrier United Airlines. The airports within a given radius from the origin could be terminals A, B, and C. The airports associated with the destination within a given radius could be terminals D, E, and F. Based on the traveler's preferred date and time of travel, the terminal lookup module 206 queries a local database 220 for all schedule information pertaining to United Airlines flights originating from airports A, B, or C and all flights ending in airports D, E, or F.

The computation subsystem 200 includes a routing module 240 that, in some instances, is configured to communicate with the terminal lookup module 206, query local database 222 for travel related information and estimate travel-related metrics. In one embodiment, the routing module 240 queries the local database 222 about schedule information pertaining to travel services originating from the origin and destination terminals received from the terminal lookup module 206. In another embodiment, the routing module 240 receives the travel schedule information and terminal locations for the different modes of transportation from the terminal lookup module 206. The received travel schedule information could include the identified modes of travel.

In one embodiment, information about the different modes of transportation provided by the local database 222 could be categorized to include a fixed schedule mode of travel and a flexible schedule mode of travel. A fixed schedule mode of travel could be travel by a bus, train, sea or airline flight, where the departure and arrival times between predetermined origin and destination terminals are published and inflexible. The travelers must confirm their schedule to meet the fixed arrival/departure times to travel between these predetermined terminals. A flexible schedule mode of travel could be travel by traveler-arranged car, such as a taxi or a limo, or other means where the traveler has reasonable control over departure time. The arrival time is determined by both aggregate distance between the origin and distance and by delay factors such as traffic congestion, weather and competition for resources (i.e. taxi demand).

In one embodiment, the information queried by the routing module 240 from the local database 222 could include, for example, information about flight schedules, a fixed schedule mode of travel. The flight schedule includes flights that fly non-stop between the origin and destination and those that fly with stop-overs at intermediate terminals between the origin and destination. Further, the information queried by the routing module 240 could include flights that require a change of flight within the same airline service at an intermediate terminal between the origin and destination terminal. Also, the information queried could include flights that require a change to a different airline service, say to American Airlines, at an intermediate terminal between the origin and destination terminal.

In another embodiment, the information queried by the routing module 240 could include information pertaining to multiple fixed schedule modes of travel services, such as schedule information pertaining to both flight and rail schedules between starting and ending locations. Also, the information queried could include travel schedule information from any terminal or location at which one travel service ends and the other begins. For example, schedule information could include flight schedules from the starting address to an intermediate location from where a traveler could take the train to the ending address. The requested schedule information is merely illustrative of the kind of schedule information that the routing module 240 could requests from local database 222, and as such, other combination of schedule information, incorporating multiple airline services through multiple intermediate terminals between starting and ending terminals, can be requested and utilized.

In embodiments, the routing module 240 utilizes the received schedule information to determine possible combinations of travel options from one or more of the travel services available between the origin and destination. For example, as discussed above, the received schedule information could be flight schedules between starting and ending terminal, including flight schedules with stop-overs at intermediate terminals. Additionally, each of the travel options could incorporate multiple airline services or other travel services, such as railways, either traveling non-stop between the destinations or routed through an intermediate destination on-route to the final destination.

Figure 3:
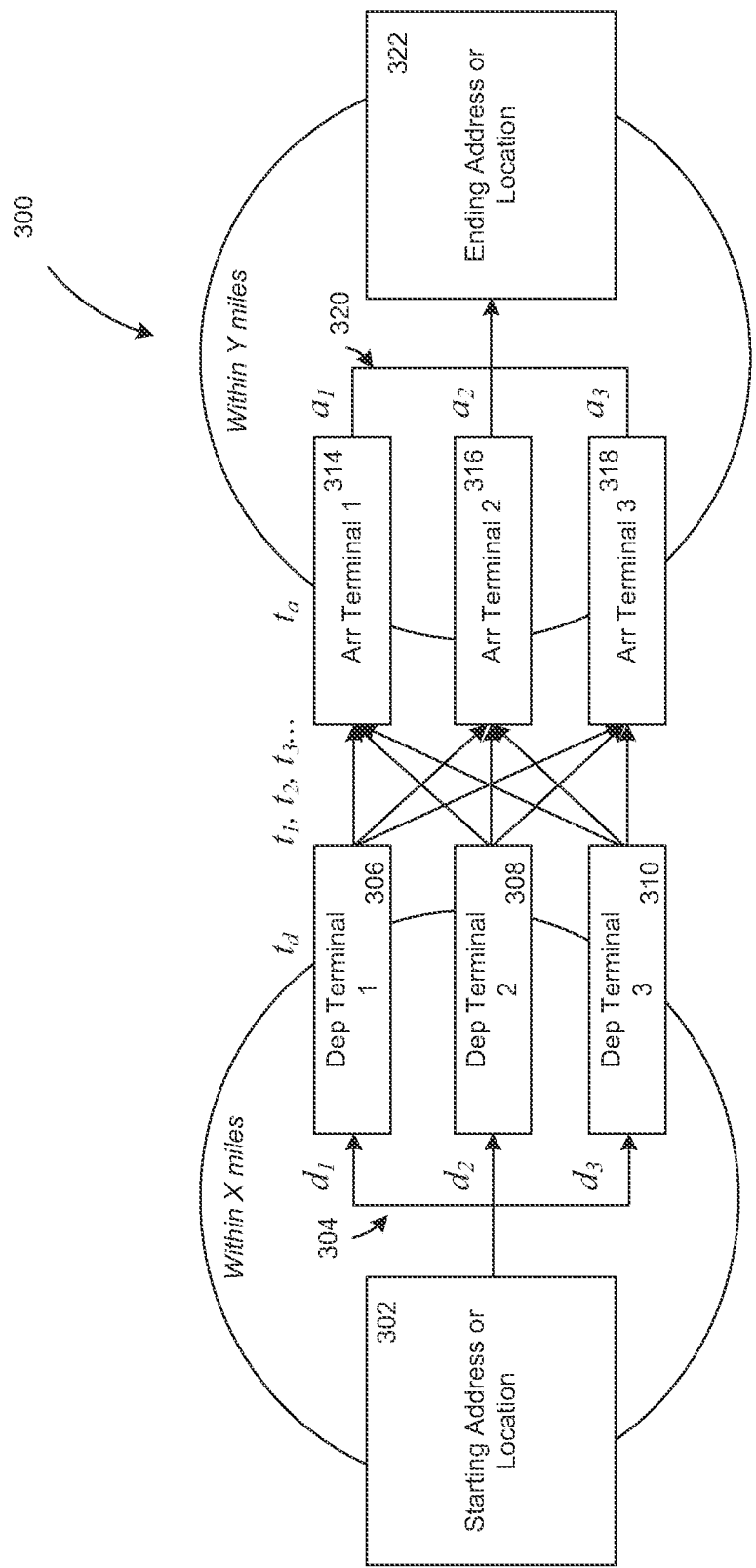
FIG. 3 illustrates possible schedule permutations in travel plan prepared by the travel plan server.

FIG. 3 illustrates the possible schedule permutations possible with travel plan 300 prepared by the routing module 240 based on the information pertaining to terminals, available travel services and their associated schedule information, etc. received from the terminal lookup module 206 and local database 222. In one embodiment, the travel plan is broken into multiple travel segments. In the illustrative segmented travel plan between an origin 302 (i.e. starting address) and a destination 322 (i.e. ending address), the travel plan involves a first travel segment 304 traveling a distance of X miles by a taxi, a flexible schedule mode of travel, in d1 hours to a origin airport terminal 306. Upon arrival at the origin airport terminal 306, the travel plan provides $t_d$, the time spent in the origin airport terminal 306 before departure. The time $t_d$ at the origin airport terminal 306 could be spent in activities such as, baggage check-in, clearing security checks, walking to the airline departure terminal, etc.

In one embodiment, the travel plan next involves a travel segment flying from the origin airport terminal 306 to a destination airport terminal 316 in a flying time of $t_2$. Upon arriving at the destination airport terminal 316, the travel plan provides $t_a$, the time spent in the destination airport terminal 316 before departure to the final destination 322. The time $t_a$ at the destination airport terminal 316 could be spent in activities such as baggage collection, transiting to the next travel service, walking to a taxi, etc. From destination airport terminal 316, the travel plan provides another travel segment requiring taking a taxi, a flexible schedule mode of travel, to travel Y miles in a1 hours to reach the final destination 322. In another instance, the travel plan could require the traveler to travel by train, a fixed schedule mode of travel, a distance of Y miles to reach the final destination 322.

A travel plan with elements 302, 306, 316, 320, 322, thus, represents a unique travel option to travel between origin and destination. Similarly, other travel options involving combinations of departure and arrival terminals can be generated. For example, a travel plan with elements 302, 304, 308, 314, 320, 322 represent a new travel option distinct from the one disclosed above. Additionally, as discussed above, each travel segment could involve different modes of travel service from the one disclosed above. For example, the first travel segment 304 can involve travel by a boat instead of a taxi to one of the origin terminals 306, 308, 310. An additional example, where travel segment 312 between origin terminal 306 and destination terminal 316 could involve travel by train, where the terminals 306 and 316 represent railway stations and travel segment 320 from arrival terminal 316 to final destination 322 could involve walking to a hotel near the final destination 322.

The routing module 240, in some instances, is also configured to estimate travel-related metrics, such as total travel time, optimal departure time from origin, probable arrival time at destination, etc. for each of the determined travel options. Further, the routing module 240 can be configured to receive, say by communicating with the receiver module 202, traveler preferences relating to the each mode of travel and adjust the estimated travel-related metrics to reflect the traveler preferences. For example, the traveler preferences related to air travel could be (1) traveler's intention to check-in baggage during travel; (2) preferred time allowance to check-in baggage; (3) preferred time allowance to clear security at a transit terminal associated with a travel service; (4) traveler's intention to use travel-related facilities such as elite-passenger check-in lines, special security and immigration infrastructure, terminal lounges or other such terminal facilities; (5) a minimum layover time at the transit terminal before departure.

In one embodiment, the routing module 240 estimates the total travel time between origin and destination for each travel option by dividing the travel option into multiple segments, with each segment characterized by a specific mode of transportation. The routing module 240 estimates a travel time for each of the travel segment and sums up the travel time spent on each of the travel segment to determine the total travel time for each of the given travel option. In some embodiments, the routing module 240 further determines any delays associated with the travel option, such as weather conditions, and adds the delays to the total travel time to provide a more accurate total travel time to the traveler.

In one embodiment, the routing module 240 estimates the travel time in a given travel segment by total the active travel time and inactive travel time spent by the traveler in the given travel segment. The routing module 240 estimates the active travel time spent by a traveler in a given travel segment by determining the time spent physically traveling in the travel service associated with the travel segment. For example, in a travel segment involving walking by the traveler to a bus terminal, the active travel time is the time spent by the traveler walking towards the destination.

In another example, in a travel segment involving flying by the traveler to a destination air terminal, the active travel time is the time spent by the traveler physically flying between the origin and destination terminals. For fixed-schedule mode travel, the routing module 240 could estimate the active travel time by computing the difference between departure and arrival times that are available in the given travel service's published operating schedule. For flexible-schedule mode travel, the routing module 240 could estimate the active travel time by dividing the distance covered in the travel segment by an assumed average speed of travel by the traveler in the given travel segment. For example, a traveler walking a distance of 10 mile at a pace of ten miles per hour will spend 1 hour as active time walking in the travel segment.

In some embodiments, the routing module 240 estimates the inactive travel time spent by a traveler in a given travel segment by determining travel factors that include: (1) time spent by the traveler transferring from one travel service to another at the end of a travel segment; (2) time spent handling baggage during transfer from one travel segment to another; (3) time spent clearing security between travel segments. For example, a travel segment involving travel by air would generally involves inactive travel time spent checking any traveler baggage at the airport terminal, clearing security at the airport terminal, walking to the departure gate after clearing security, boarding the airplane, waiting for take-off, etc.

The routing module 240, in some instances, is also configured to estimate travel-related delays that affect the total travel time. In some embodiments, the routing module 240 can be configured to query a local database 224 to retrieve information pertaining to delays associated with each mode of travel and either adjust the estimated travel time of each travel segment according to any related delay or adjust the overall travel time by the sum of all the delays in the various travel segments. In some embodiments, the routing module 240 can estimate travel-related delay (or simply, a "travel-delay") by performing statistical analysis of factors such as the reliability of a travel service, possible delay related to a congestion of infrastructure used by the travel service, possible weather conditions affecting the travel service associated with the given travel segment, etc.

For example, a travel segment involving travel by a bus could possibly be affected by travel-related delays such as the bus not leaving on-time from the origin due to terminal congestion. Further, the route taken by the bus could regularly be affected by rush-hour traffic at the time of travel, slowing down the bus below its average estimated travel speed. Additionally, the route taken by the bus could directly be affected by forecast weather conditions at the time of travel, contributing to the travel-related delay. The routing module 240 could analyze data related to the bus services' performance, such as on-time departure percentage, data related to traffic density at time of travel, forecast weather conditions affecting the travel route at the time of travel, etc. to determine the likely travel-related delay that the traveler would experience in the travel segment involving travel by bus.

The routing module 240, as disclosed above, estimates a travel time for each of the travel segment and sums up the travel time spent on each of the travel segment to determine the total travel time for each of the given travel option. In some embodiments, the routing module 240 further determines any delays associated with the travel option, such as weather conditions, and adds the delays to the total travel time to provide a more accurate total travel time to the traveler.

Figure 4:
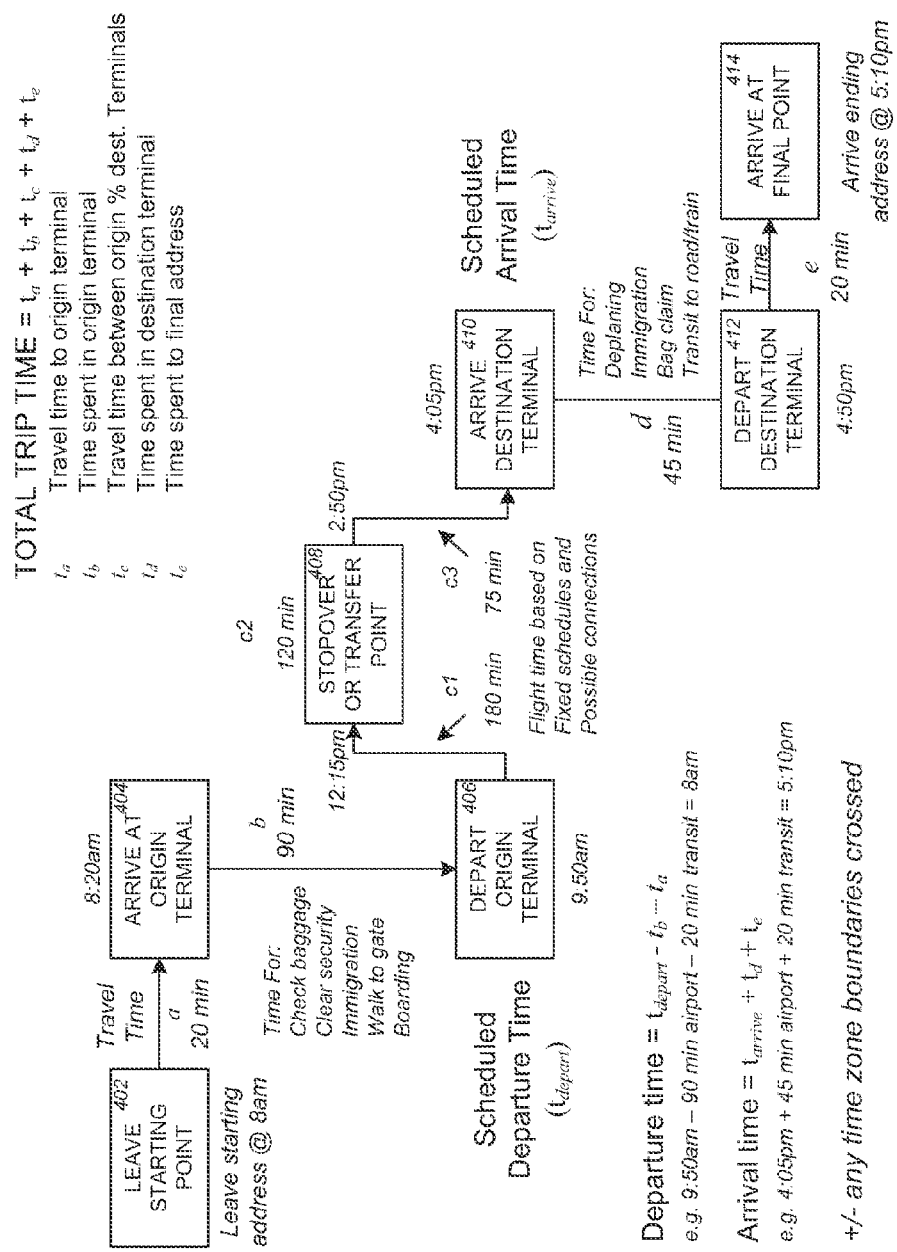
FIG. 4 illustrates an itinerary of a travel plan prepared by the travel plan server.

FIG. 4 illustrates an itinerary of a travel plan 400 prepared by the routing module 240, where the travel plan between origin and destination is broken into multiple travel segments with each segment characterized by factors such as a specific mode of transportation. The travel plan 400 is used to help illustrate the estimation of total travel time between origin 402 and destination 414 using the method disclosed above. The travel between origin 402 and destination 414 is broken into multiple travel segments, each denoted by "a", "b", "c1", "c2", "c3", "d", and "e" respectively in FIG. 4. The travel plan 400 concerns a traveler leaving from her home and traveling onwards towards her final destination, a hotel, in another city. The traveler travels by a car to reach an airport terminal, from where she flies to a final destination terminal near the city where the hotel is located. Upon arrival at the destination terminal, the traveler again travels by a taxi to reach her final destination. The routing module 240 can provide the traveler an estimated total time of travel needed to travel from her home to the hotel.

For a given day of travel, the routing module 240 determines the total time of travel needed to travel from traveler's home 402 to the hotel 414 by first dividing the travel into segments of travel characterized by the mode of travel. The routing module 240 segments the travel into travel segments "a", "b", "c1", "c2", "c3", "d", and "e", where segments "a" and "e" involve traveling by car, segments "b", "c2", and "d" involve travel by walking, segments "c1" and "c3" involve travel by flying. In one embodiment, the routing module 240 estimates active and inactive travel time, including travel-related delay, in each travel segment, starting with the travel segment connecting the origin and ending with the travel segment connecting the destination to the travel plan.

In one embodiment, the routing module 240 first determines the active time of travel from home 402 to the airport terminal 404 by car in travel segment "a". Based on the distance of travel from home 402 to the airport terminal 404 and estimated speed of travel by car, the routing module 240 estimates active time of travel to be 15 minutes. Given that travel segment "a" is the first travel segment and that it's traveled by a flexible-mode of travel, no inactive travel time, such as transitioning to next travel segment, is incurred. The car is available for travel at home when the traveler decides to start her travel.

In embodiments, the routing module 240 further queries the local database 224 to retrieve information relating to traffic and weather conditions that could affect the car travel route taken from home 402 to the airport terminal 404. Based on a statistical analysis of the retrieved information, the routing module 240 can adjust the average traveling speed of the car on the travel segment "a" to reflect the traffic and weather conditions. The adjusted traveling speed on the travel segment "a" can be used to determine whether additional time is needed to complete the travel in travel segment "a". The routing module 240 could determine such a travel-related delay to be about 5 minutes in travel segment "a". The estimated travel time on travel segment "a" would then be the sum of active time of travel in segment "a" and travel-related delay in segment "a", for an overall total travel time, $t_a$, of 20 minutes on segment "a".

Upon arriving at the airport terminal 404, the routing module 240 determines the active time of travel and inactive time of travel from the time of arrival at the origin airport terminal 404 till departure from origin airport terminal 404. The routing module 240 characterizes this segment of travel as segment "b", where the traveler walks from the check-in counter at the entrance of the origin airport terminal 404 to the departure gate 406 at the origin airport terminal 404. Based on the average walking speed and walking distance between the check-in counter and departure gate 406, the routing module 240 estimates active time of travel to be 10 minutes.

In one embodiment, the routing module 240 determines the inactive travel time in segment "b" based on segment specific activities such as time to check-in baggage, clear security between check-in and departure gate, clear immigration when necessary, boarding the plane, etc. Based on a statistical analysis of the information retrieved from local database 224, the routing module 240 determines the time to attend to such segment specific activities in segment "b" to be about 60 minutes.

In embodiments, the routing module 240 further determines any travel-related delay or traveler preferences that affect the travel in segment "b" and adjusts the overall travel time spent in the travel segment "b". By analyzing the traveler preferences related to amount of time traveler prefers to allow for baggage check-in, clear security, walk to the departure gate, the routing module 240 can estimate the additional time, if any, that should be added to the total travel time. The routing module 240 adds the additional travel time when the traveler prefers a higher time allowance over the time allowance for each of the overlapping activity that was estimated by the routing module 240 in its inactive time of travel. The routing module 240 sums the active time of travel, inactive time of travel and the associated travel-related delay to determine a total travel time, $t_b$, of 90 minutes in travel segment "b".

Upon departing from the departure gate 406 of origin airport terminal 404, the routing module 240 determines the active and inactive time of travel for travel segment "c1", where the mode of travel is flying, a fixed-schedule mode of travel. The time of travel is based on the time of departure from the departure gate 406 of origin airport terminal 404 to arrival at the arrival gate of stopover airport terminal 408. Given that the travel in segment "c1" is by a fixed-schedule mode of travel, the routing module 240 can query the local database 222 for flight schedule information and determine the total active time spent flying between the two locations. The routing module 240 determines flying in segment "c1" takes about 170 minutes.

Additionally, in some instances, the routing module 240 will determine no inactive travel time is incurred while flying. The routing module 240 queries the local database 224 to determine if any weather systems or any regular traffic conditions in the air-corridor used by the airline affects the travel time between the locations. Based on a statistical analysis of the information received, the routing module adds another 20 minutes to the active travel time as travel-related delay. The routing module 240 determines the overall total travel time, $t_{c1}$, in segment "c1" to be 180 minutes.

In one embodiment, the routing module 240 creates a new travel segment between the traveler's arrival at the stop-over terminal 408 and the traveler's departure from the stop-over terminal 408. The mode of travel in this travel segment "c2" is walking, where the traveler, if applicable, walks between an arrival and a departure gate. Given that the traveler is in the airport, waiting for her connection flight onwards to her final destination, the routing module 240 can use the published schedule information to determine the amount of inactive travel time spent waiting for the connection flight. The routing module 240 determines the waiting time to be 120 minutes. The routing module 240 determines the distance the traveler needs to walk between the arrival and departure gate in travel segment "c2". If the time to travel between the gates is less than the inactive waiting time spent in the stop-over terminal 408, the routing module 240 determines the active travel time and inactive travel time overlaps. The routing module 240, therefore, reports the total travel time, $t_{c2}$, in segment "c2" to be 120 minutes, the total inactive travel time.

Upon departing from the stop-over terminal 408, the routing module 240 determines the active and inactive time of travel for travel segment "c3", where the mode of travel is flying, a fixed-schedule mode of travel. The time of travel is based on the time of departure from the stop-over terminal 408 to arrival at the destination airport terminal 410. Given that the travel in segment "c3" is by a fixed-schedule mode of travel, the routing module 240 can query the local database 222 for flight schedule information and determine the total active time spent flying between the two locations. The routing module 240 determines flying in segment "c3" takes about 65 minutes.

Additionally, in some instances, the routing module 240 will determine no inactive travel time is incurred while flying. The routing module 240 queries the local database 224 to determine if any weather systems or any regular traffic conditions in the air-corridor used by the airline affects the travel time between the locations. Based on a statistical analysis of the information received, the routing module adds another 10 minutes to the active travel time as travel-related delay. The routing module 240 determines the overall total travel time, $t_{c3}$, in segment "c3" to be 75 minutes.

Upon arriving at the destination airport terminal 410, the routing module 240 determines the active and inactive time of travel from the time of arrival at the destination airport terminal 410 till departure from arrival lounge 412 at destination airport terminal 410. The routing module 240 characterizes this segment of travel as segment "d", where the traveler walks from the arrival gate at the destination airport terminal 410 to the arrival lounge 412 at the airport terminal 410. Based on the average walking speed and walking distance between the arrival gate and the arrival lounge, the routing module 240 estimates active time of travel to be 10 minutes.

In one embodiment, the routing module 240 determines the inactive travel time in segment "b" based on segment specific activities such as time to disembark from the plane, claim baggage, clear immigration, etc. Based on a statistical analysis of the information retrieved from local database 224, the routing module 240 determines the time to attend to such segment specific activities in segment "d" to be about 25 minutes.

In embodiments, the routing module 240 further determines any travel-related delay or traveler preferences that affect the travel in segment "d" and adjusts the overall travel time spent in the travel segment "d". By analyzing the traveler preferences related to amount of time traveler prefers to allow for claiming baggage, clear immigration, walk to the arrival lounge, the routing module 240 can estimate the additional time, if any, that should be added to the total travel time. The routing module 240 adds the additional travel time when the traveler prefers a higher time allowance over the time allowance for each of the overlapping activity that was estimated by the routing module 240 in its inactive time of travel. The routing module 240 sums the active time of travel, inactive time of travel and the associated travel-related delay to determine a overall total travel time, $t_d$, of 45 minutes for travel segment "d".

In one embodiment, the routing module 240 next determines the active time of travel from the arrival lounge 412 in destination airport terminal 410 by car in travel segment "e". Based on the distance of travel from arrival lounge 412 to the hotel 414 and estimated speed of travel by car, the routing module 240 estimates active time of travel to be 15 minutes. Given that travel segment "e" is the last travel segment and that it's traveled by a flexible-mode of travel, no inactive travel time, such as waiting for a taxi, is incurred. The taxi is available upon a second's notice at the arrival lounge when the traveler decides to start her travel to hotel.

In embodiments, the routing module 240 further queries the local database 224 to retrieve information relating to traffic and weather conditions that could affect the car travel route taken from arrival lounge 412 to the hotel 414. Based on a statistical analysis of the retrieved information, the routing module 240 can adjust the average traveling speed of the car on the travel segment "e" to reflect the traffic and weather conditions. The adjusted traveling speed on the travel segment "e" can be used to determine whether additional time is needed to complete the travel in travel segment "e". The routing module 240 could determine such a travel-related delay to be about 5 minutes in travel segment "e". The estimated travel time on travel segment "e" would then be the sum of active time of travel in segment "e" and travel-related delay in segment "e". The routing module 240 determines the total travel time, $t_e$, in segment "e" to be 20 minutes.

In embodiments, the routing module 240 estimates travel-related timing metrics such as overall travel time from origin to destination, optimal departure time from origin, possible arrival time at destination, etc. using the travel time estimated for each of the travel segment and other factors such as whether the mode of travel in a given segment is fixed or flexible. The overall travel time to travel from origin to destination is the sum of all travel times in every travel segment between origin and destination.

In the illustrative travel plan 400 in FIG. 4, the overall travel time to travel from home to hotel is the sum of all travel times in every travel segment between home and hotel. The travel segments between home and hotel are segments, as described above, are "a", "b", "c1", "c2", "c3", "d" and "e", where "$t_a$", "$t_b$", "$t_{c1}$", "$t_{c2}$", "$t_{c3}$", "$t_d$" and "$t_e$" are the travel times in the travel segments respectively. The overall travel time $T_{tot}$ is described below:

$$T_{tot} = t_a + t_b + t_{c1} + t_{c2} + t_{c3} + t_d + t_e \quad (1)$$

As described above, travel time $t_a$ was 20 minutes, $t_b$ was 90 minutes, $t_{c1}$ was 180 minutes, $t_{c2}$ was 120 minutes, $t_{c3}$ was 75 minutes, $t_d$ was 45 minutes, and $t_e$ was 20 minutes. Based on the estimates, the routing module 240 determines the overall travel time $T_{tot}$ to be 550 minutes, or about 9.17 hours.

In embodiments, the routing module 240 estimates travel-related timing metrics such as optimal departure time from origin, possible arrival time at destination, etc. using the travel time estimated for each of the travel segment and other factors such as whether the mode of travel in a given segment is fixed or flexible. A fixed travel component can be, e.g., a bus, train, sea or airline flight where the departure and arrival times between predetermined origin and destination terminals are published and inflexible. The travelers must confirm their schedule to meet the fixed arrival/departure times to travel between these predetermined terminals. A flexible travel component can be, e.g., travel by traveler-arranged car (private or taxi/limo) or other means where the traveler has reasonable control over departure time. The arrival time can be determined by both aggregate distance between the origin and distance and by delay factors such as traffic congestion, weather and competition for resources (i.e. taxi demand).

In embodiments, the routing module 240 provides travelers an estimate of the best time to depart from the origin. As described above in FIGS. 3 and 4, travel plans generally involve both fixed-travel segment and flexible-travel segment. In embodiments, the routing module 240 follows the below method in determining the optimal departure time from origin: In the above travel plans, the traveler can depart and travel at will in the flexible travel service components. However, to travel by fixed travel service components, the traveler has to adhere to the published schedule information of the fixed travel service components. Therefore, when using a travel plan involving both fixed and flexible travel service components, estimating the optimal time to depart from the origin has to start with the service schedule of the first fixed travel service used by the traveler. By working backward from the departure time of the first fixed travel service, the optimal time to depart from origin can be estimated. The departure time from origin can be estimated by rolling back the clock from the departure time of the first fixed travel service by the total travel time needed to travel between each travel segment connecting the origin and the travel segment with the first fixed travel service.

Figure 5:
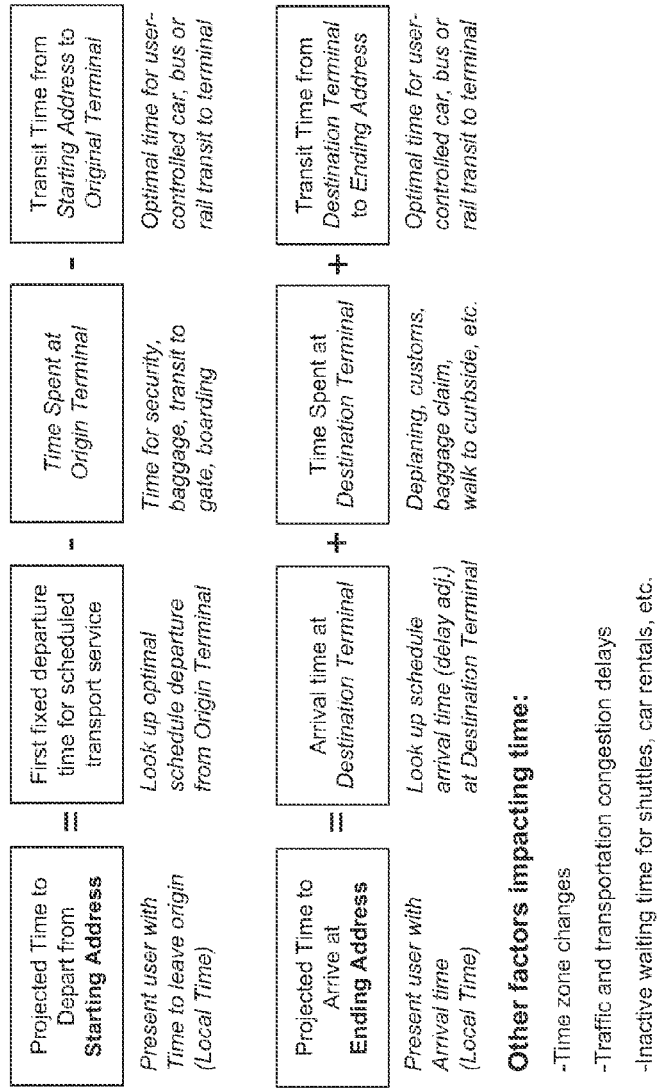
FIG. 5 illustrates a process for estimation of optimal departure time and possible arrival time.

FIGS. 4 and 5 provide an illustrative example of a method to determine the optimal departure time from origin. As described above, the routing module 240 segments the travel plan 400 into multiple travel segments, where travel segment "a" is traveled by car, travel segment "b" is traveled by walking, and travel segment "c1" is traveled by flying. Further, travel segment "a" originates from the home (i.e. origin) of the traveler and serially connects to travel segment "c1". As described above, travel segments "a" and "b" are traveled by flexible travel service components. Travel segment "c1", traveled by airplane, is the first fixed travel service component connecting the traveler's home (i.e. origin) to the hotel (i.e. destination). FIG. 5 describes how the overall departure time from origin is computed and lists some of the different factors affecting travel time in each segment of travel related to the departure time estimation.

According to the travel plan 400, the flight departs origin airport terminal 406 at 9:50 am on the day of travel. The routing module 240 starts with the 9:50 am flight departure time ($t_{depart}$) in order to calculate the time to depart from the traveler's home, rolling back the clock by the sequential time needed to travel in travel segments "a" and "b". As described above, the routing module 240 estimated overall travel time to travel in segment "b" to be about 90 minutes ($t_b$) including the inactive time and any travel-related delay. The routing module rolls back the previous departure time from origin by 90 minutes, where the departure time from origin is now changed from 9:50 am to 8:20 am.

The routing module 240 next utilizes the earlier estimated overall travel time to travel in segment "a" to further roll back the time to depart from origin. The routing module 240 estimated the time to travel in segment "a" to be about 20 minutes ($t_a$) including the inactive time and any travel-related delay. The routing module 240 rolls back the previous departure time from origin by 20 minutes, where the departure time from origin is now changed from 8:20 am to 8:00 am. Upon evaluating the travel segment connecting the origin to the rest of the travel plan, the routing module 240 reports the last estimated optimal departure from origin, i.e. 8:00 am, as the best time for the traveler to begin the travel. The optimal departure time of 8:00 am ($T_{begin}$) as described above is:

$$T_{begin}=t_{depart}-t_b-t_a \qquad (2)$$

In embodiments, the routing module 240 provides travelers an estimate of the possible time of arrival at the final destination. As described above in FIGS. 3 and 4, travel plans generally involve both fixed-travel segment and flexible-travel segment. In embodiments, the routing module 240 follows the below method in determining the possible time of arrival at the final destination: In the above travel plans, the traveler can travel and arrive at will in the flexible travel service components. However, in the fixed travel service components, the traveler's arrival time is determined by the published schedule information of the fixed travel service components. Therefore, when using a travel plan involving both fixed and flexible travel service components, estimating the possible arrival time at the final destination has to start with the service schedule of the last fixed travel service used by the traveler. By working forward from the arrival time of the last fixed travel service, the possible time of arrival at the final destination can be estimated. The possible time of arrival at the final destination can be estimated by forwarding the clock from the time of arrival by the last fixed travel service by the total travel time needed to travel between each travel segment connecting the travel segment with the last fixed travel service and the destination.

FIGS. 4 and 5 provide an illustrative example of a method to determine the possible time of arrival at the final destination. As described above, the routing module 240 segments the travel plan 400 into multiple travel segments, where travel segment "e" is traveled by car, travel segment "d" is traveled by walking, and travel segment "c3" is traveled by flying. Further, travel segment "e" terminates at the hotel (i.e. destination) of the traveler and also serially connects to travel segment "c3". As described above, travel segments "d" and "e" are traveled by flexible travel service components. Travel segment "c3", traveled by airplane, is the last fixed travel service component connecting the hotel (i.e. destination) to the traveler's home (i.e. origin). FIG. 5 describes how the overall time of arrival at the destination is computed and lists some of the different factors affecting travel time in each segment of travel related to the arrival time estimation.

According to the travel plan 400, the flight arrives at destination airport terminal 410 at 4:05 pm on the day of travel. The routing module 240 starts with 4:05 pm as the time of arrival at the hotel (i.e. the traveler's final destination) and forwards the clock by the time needed to travel in travel segments "d" and "e". As described above, the routing module 240 estimated overall travel time to travel in segment "d" to be about 45 minutes including the inactive time and any travel-related delay. The routing module 240 forwards the arrival time at destination by 45 minutes ($t_d$), where the arrival at destination is now changed from 4:05 pm to 4:50 pm.

The routing module 240 next utilizes the earlier estimated overall travel time to travel in segment "e" to further forward the time of arrival at the hotel. The routing module 240 estimated the time to travel in segment "e" to be about 20 minutes ($t_e$) including the inactive time and any travel-related delay. The routing module forwards the previous arrival time at the hotel by 20 minutes, where the arrival time at destination is now changed from 4:50 pm to 5:10 pm. Upon evaluating the travel segment connecting the destination to the rest of the travel plan, the routing module 240 reports the last estimated possible arrival time at the hotel, i.e. 5:10 pm, as the traveler's most likely time of arrival at the destination. The possible arrival time at destination $T_{end}$ as described above:

$$T_{end}=t_{arrive}+t_d+t_e \qquad (3)$$

The computation subsystem 200 includes an optimization module 208 that, in some instances, is configured to communicate with the routing module 240. In some instances, the travel optimization module 208 receives from the routing module 240, a list of travel options and related traveler preferences, such as preferred carrier in a given mode of transportation, date of travel, maximum radius within which to choose transit terminals associated with a travel service from, etc. In one embodiment, the optimization module 208 filters the list of travel options according to the received traveler preferences. For example, if one of the traveler preferences is to arrive at the destination by a given time, the optimization module 208 removes any travel option with time of arrival at destination later than the preferred arrival time provided by the traveler.

The computation subsystem 200 includes a display module 210 that, in some instances, is configured to communicate with the optimization module 208. In some instances, the display module 210 receives from the optimization module 208, a list of optimized travel options reflecting the traveler preferences. The display module 210 transmits the travel options to the traveler using a traveler-specific transmission mechanism. In at least one embodiment, each list-item of the travel options includes a link to a corresponding primary source, and the traveler has to follow the hyperlink to be able to view the travel options and reserve any travel service when needed. In such an embodiment, the user only receives a list of travel options through the travel planning service, and has to use a service offered by a corresponding primary source to reserve a travel service offered by that primary source.

In another embodiment, the display module 210 transmits the generated travel options to a web server. The traveler can then view the travel options through a web browser, where the web server hosts a website that lists the travel options. The website includes a plurality of web pages that can be viewed by a traveler using a web browser. The web server refreshes the web pages with the travel options received from the display module 210. FIGS. 7 and 8 illustrate a web page with listings of the received travel options and associated travel-metrics that were generated by the computation subsystem 200.

FIG. 7 is an illustration of a webpage with listings of the received travel options and some of the associated travel-metrics. The webpage displays the origin and destination addresses under "From" and "To" sections. The webpage further displays the traveler's preferred time of travel as "Leave" and "Arrive" sections. The webpage lists the various received travel options and associated travel-metrics in a table format. The displayed travel option reflects the travel plan 400, where the traveler travels from her home to a hotel in a nearby city. The travel plan 400 involves the traveler traveling part of the distance by car and another part by airplane.

For each travel option, the webpage provides the traveler the following: a date and time of departure from the origin under "Departure Date & Time"; the distance and time of travel to reach the airport by car, a map link to travel route, etc. under "Drive to Airport" section; the name of the origin airport, the time of arrival at the origin airport, the time of departure from the origin airport, etc. under "Origin Airport" section; flight details of the departing flight, such as total flying time, average flight delays, etc. under "Your Flights"

section; the name of the destination airport, the time of arrival at the destination airport, the time spent at the destination airport, etc. under "Arrival Airport" section; the distance and time of travel to reach the destination by car, a map link to travel route, etc. under "Drive to Destination" section; and a date and time of arrival at the destination under "Arrival Date & Time".

FIG. 8 is an illustration of a webpage with detailed travel-related information regarding a travel option chosen from the provided list of travel options displayed in FIG. 7. FIG. 8 provides details of the first travel option in FIG. 7, where the traveler is expected to depart at "6:57 am". The webpage lists the travel-related information by grouping the information around the first and last fixed travel service components in the travel plan 400. Under "STARTING POINT", the webpage displays the origin address, optimal time of departure from origin, other travel-related timing metrics, etc. from the perspective of the flight departing from the origin airport. Similarly, under the "ENDING POINT", the webpage displays the destination address, possible time of arrival at destination, other travel-related timing metrics, etc. from the perspective of the flight arriving at the destination airport. Also, the webpage provides the traveler with details of all the flights taken, including any statistical information relating to the performance of the flight service.

Figure 9:
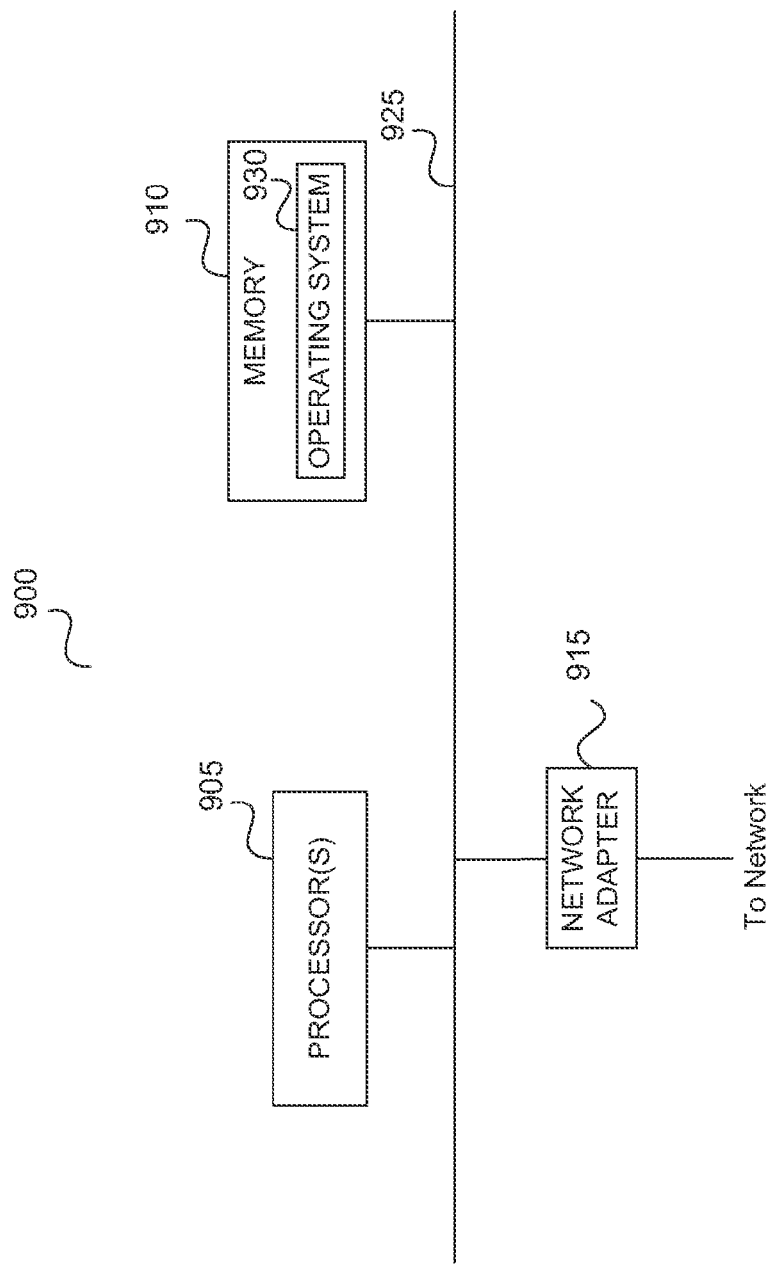
FIG. 9 is a high-level block diagram showing an example of the architecture for a computer system.

FIG. 9 is a high-level block diagram showing an example of the architecture for a computer system 900 that can be utilized to implement a travel plan server (e.g., 114 from FIG. 1), a web server (e.g., 125 from FIG. 1), etc. In FIG. 9, the computer system 900 includes one or more processors 905 and memory 910 connected via an interconnect 925. The interconnect 925 is an abstraction that represents any one or more separate physical buses, point to point connections, or both connected by appropriate bridges, adapters, or controllers. The interconnect 925, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 905 may include central processing units (CPUs) to control the overall operation of, for example, the host computer. In certain embodiments, the processor(s) 905 accomplish this by executing software or firmware stored in memory 910. The processor(s) 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 910 is or includes the main memory of the computer system. The memory 910 represents any form of random access memory (RAM), read-only memory (ROM), flash memory (as discussed above), or the like, or a combination of such devices. In use, the memory 910 may contain, among other things, a set of machine instructions which, when executed by processor 905, causes the processor 905 to perform operations to implement embodiments of the present invention.

Also connected to the processor(s) 905 through the interconnect 925 is a network adapter 915. The network adapter 915 provides the computer system 900 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35U.S.C. §112, ¶6 will begin with the words "means for.") Accordingly, the applicant reserves the right to add additional claims after filing the application to pursue such additional claim forms for other aspects of the invention.

What is claimed is:

1. A method for estimating a travel time between an origin and a destination, the method comprising:
   determining a plurality of travel options from the origin to the destination, the determination of the plurality of travel options influenced by the one or more first user preferences, each travel option comprising a plurality of serial travel segments, the plurality of serial travel segments serially connected in a manner such that each travel segment is a component of a specific user travel from the origin to the destination, further wherein at least two travel service types are found providing travel service for the plurality of serial travel segments;
   for each of the travel options, identifying a total time of estimated travel for each of the plurality of serial travel segments, the total time of estimated travel for a given travel segment being a function of both a nature of travel service associated with the given travel segment and one or more second user preferences associated with the travel service corresponding to the given travel segment, wherein the second user preferences include a user intention indicator for a minimum layover time, wherein the user intention indicator includes an intention to check-in baggage during travel, a time allowance to check-in baggage, a time allowance to clear security at a transit terminal associated with a travel service, and a time allowance for using a travel related facility at the transit terminal before departure;
   for each of the travel options, calculating a total estimated travel time as a function of the sum of total estimated travel times associated with each of the plurality of travel segments plus the minimum layover time as reflected by the user intention indicator; and
   for each of the travel options, providing the total estimated travel time to the user as a predicted travel time to travel from the origin to the destination.

2. The method recited above in claim 1, wherein the origin includes one or more of:
   a property with an address;
   a partial street address;
   a name of a hotel;
   a name of a landmark;
   a transit terminal of a travel service; or
   a location with a global positioning coordinates.

3. The method recited above in claim 2, wherein the origin includes property with the address, and the property with the address includes property other than hotels and houses.

4. The method recited above in claim 2, wherein the transit terminal of the travel service includes transit terminals other than airports and railway stations.

5. The method recited above in claim 1, wherein the destination includes one or more of:
   a property with an address;
   a partial street address;
   a name of a hotel;
   a name of a landmark;
   a transit terminal of a travel service; or
   a location with a global positioning coordinates.

6. The method recited above in claim 5, wherein the property with an address includes property other than a hotel.

7. The method recited above in claim 5, wherein the transit terminal of the travel service includes transit terminals other than airports or railway stations.

8. The method recited above in claim 1, wherein the first user preferences include one or more of:
   a date of travel;
   a time of travel;
   a preferred mode of transportation;
   a preferred carrier in a given mode of transportation;
   a maximum radius within which to choose transit terminals associated with a travel service from;
   an earliest starting time to begin travel from origin;
   a latest terminating time to arrive at destination;
   a maximum layover time between each travel segments;
   a minimum layover time between each travel segments;
   a maximum travel time to travel from origin to destination; or
   a maximum total travel cost to travel from origin to destination.

9. The method recited above in claim 1, wherein the travel service type includes travel service by means other than trains and airplanes.

10. The method recited above in claim 1, wherein the second user preferences include one or more of:
    an intention to check-in baggage during travel;
    a time allowance to check-in baggage;
    a time allowance to clear security at a transit terminal associated with a travel service; or
    a minimum layover time at the transit terminal before departure.

11. The method recited above in claim 1, wherein the estimation of travel time for each of the plurality of serial travel segments further comprises:
    determining active travel time spent traveling in a travel service associated with a given travel segment;
    determining inactive travel time in the given travel segment, wherein such inactive travel time includes:
      time spent transferring to the travel service associated with the given travel segment,
      time spent handling baggage between a serially connected travel segments, and
      time spent clearing security between the serially connected travel segments;
    calculating a preliminary travel time as a sum of the determined active travel time and the determined inactive travel time for the given travel segment; and
    estimating the travel time for the given travel segment as a sum of the preliminary travel time and an estimated travel-delay time.

12. The method recited above in claim 11, wherein the estimated travel-delay time is a function of a result of a statistical analysis of one or more of:
    a travel service reliability;
    a survey of prior traveler itinerary and associated travel times;

a delay related to a congestion of infrastructure used by the travel service associated with the given travel segment; or a weather condition affecting the travel service associated with the given travel segment.

13. A travel plan system for estimating a travel time between an origin and a destination, the system comprising:

a computation subsystem configured to determine a plurality of travel options from the origin to the destination, the determination of the plurality of travel options influenced by the one or more first user preferences, each travel option comprising a plurality of serial travel segments, the plurality of serial travel segments serially connected in a manner such that each travel segment is a component of a specific user travel from the origin to the destination, further wherein at least two travel service types are found providing travel service for the plurality of serial travel segments;

for each of the travel options, the computation subsystem configured to identify a total time of estimated travel for each of the plurality of serial travel segments, the total time of estimated travel for a given travel segment being a function of both a nature of travel service associated with the given travel segment and one or more second user preferences associated with the travel service corresponding to the given travel segment, wherein the second user preferences include a user intention indicator to adjust estimated travel-related metrics, the user intention indicator including at least an intention to check-in baggage during travel, a time allowance to check-in baggage, a time allowance to clear security at a transit terminal associated with a travel service, and a time allowance for using a travel related facility at the transit terminal before departure or any combination;

for each of the travel options, the computation subsystem configured to calculate a total estimated travel time as a function of the sum of total estimated travel times associated with each of the plurality of travel segments; and for each of the travel options, the computation subsystem configured to provide the total estimated travel time to the user as a predicted travel time to travel from the origin to the destination.

14. The system recited above in claim 13, wherein the origin includes one or more of:
    a property with an address;
    a partial street address;
    a name of a hotel;
    a name of a landmark;
    a transit terminal of a travel service; or
    a location with a global positioning coordinates.

15. The system recited above in claim 14, wherein the origin includes property with the address, and the property with the address includes property other than hotels and houses.

16. The system recited above in claim 14, wherein the transit terminal of the travel service includes transit terminals other than airports and railway stations.

17. The system recited above in claim 13, wherein the destination includes one or more of:
    a property with an address;
    a partial street address;
    a name of a hotel;
    a name of a landmark;
    a transit terminal of a travel service; or
    a location with a global positioning coordinates.

18. The system recited above in claim 17, wherein the property with an address includes property other than a hotel.

19. The system recited above in claim 17, wherein the transit terminal of the travel service includes transit terminals other than airports or railway stations.

20. The system recited above in claim 13, wherein the first user preferences include one or more of:
    a date of travel;
    a time of travel;
    a preferred mode of transportation;
    a preferred carrier in a given mode of transportation;
    a maximum radius within which to choose transit terminals associated with a travel service from;
    an earliest starting time to begin travel from origin;
    a latest terminating time to arrive at destination;
    a maximum layover time between each travel segments;
    a minimum layover time between each travel segments;
    a maximum travel time to travel from origin to destination; or
    a maximum total travel cost to travel from origin to destination.

21. The system recited above in claim 20, wherein the travel service type includes travel service by means other than trains and airplanes.

22. The system recited above in claim 13, wherein the second user preferences include one or more of:
    an intention to check-in baggage during travel;
    a time allowance to check-in baggage;
    a time allowance to clear security at a transit terminal associated with a travel service; or
    a minimum layover time at the transit terminal before departure.

23. The system recited above in claim 13, wherein the estimation of travel time for each of the plurality of serial travel segments further comprises:
    determining active travel time spent traveling in a travel service associated with a given travel segment;
    determining inactive travel time in the given travel segment, wherein such inactive travel time includes:
        time spent transferring to the travel service associated with the given travel segment,
        time spent handling baggage between a serially connected travel segments, and
        time spent clearing security between the serially connected travel segments;
    calculating a preliminary travel time as a sum of the determined active travel time and the determined inactive travel time for the given travel segment; and
    estimating the travel time for the given travel segment as a sum of the preliminary travel time and an estimated travel-delay time.

24. The system recited above in claim 23, wherein the estimated travel-delay time is a function of a result of a statistical analysis of one or more of:
    a travel service reliability;
    a survey of prior traveler itinerary and associated travel times;
    a delay related to a congestion of infrastructure used by the travel service associated with the given travel segment; or
    a weather condition affecting the travel service associated with the given travel segment.

25. A method for estimating a travel time between an origin and a destination, the method comprising:
    receiving the origin associated with a starting time from a user; wherein the starting time is the earliest starting time for the user to begin travel from the origin;
    receiving the destination associated with a earliest terminating time and a latest terminating time from the user;

wherein the earliest arriving time is the earliest terminating time for the user to arrive at destination and the latest arriving time is the latest terminating time for the user to arrive at destination;

determining a plurality of travel options from the origin to the destination based on the starting time, the earliest terminating time and the latest terminating time, the determination of the plurality of travel options influenced by the one or more first user preferences, each travel option comprising a plurality of serial travel segments, the plurality of serial travel segments serially connected in a manner such that each travel segment is a component of a specific user travel from the origin on or after the starting time to the destination on or after the earliest terminating time and on or before the latest terminating time, further wherein at least two travel service types are found providing travel service for the plurality of serial travel segments;

for each of the travel options, identifying a total time of estimated travel for each of the plurality of serial travel segments, the total time of estimated travel for a given travel segment being a function of both a nature of travel service associated with the given travel segment and one or more second user preferences associated with the travel service corresponding to the given travel segment, wherein the second user preferences include a user intention indicator for a minimum layover time, wherein the user intention indicator includes an intention to check-in baggage during travel, a time allowance to check-in baggage, a time allowance to clear security at a transit terminal associated with a travel service, and a time allowance for using a travel related facility at the transit terminal before departure;

for each of the travel options, calculating a total estimated travel time as a function of the sum of total estimated travel times associated with each of the plurality of travel segments plus the minimum layover time as reflected by the user intention indicator; and for each of the travel options, providing the total estimated travel time associated with the starting time, the earliest terminating time and the latest terminating time to the user as a predicted travel time to travel from the origin to the destination.

* * * * *